United States Patent Office 3,105,303
Patented Oct. 1, 1963

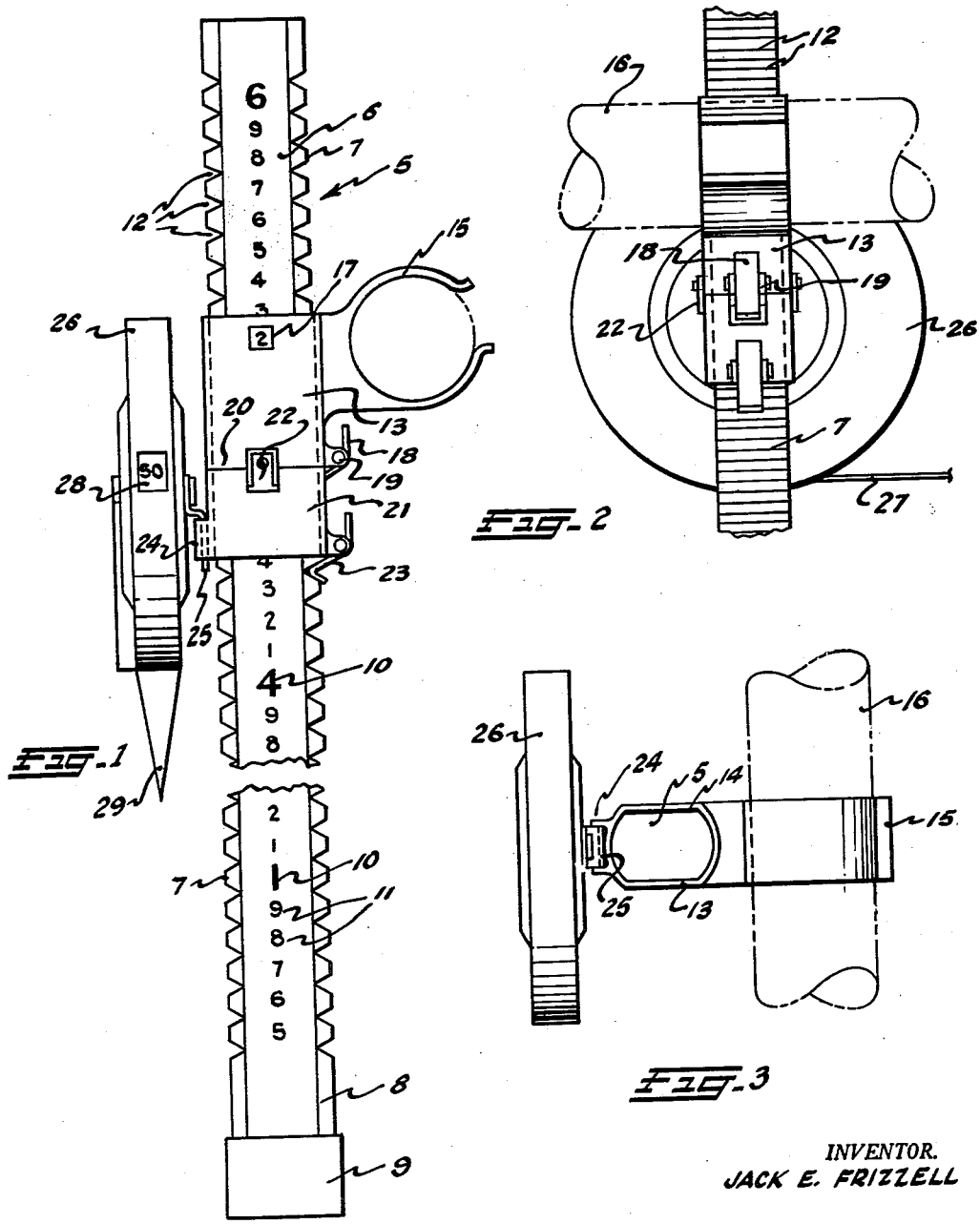

3,105,303
LEVELLING INSTRUMENT
Jack E. Frizzell, P.O. Box 121, Salt Lick, Ky.
Filed May 16, 1962, Ser. No. 195,142
3 Claims. (Cl. 33—74)

This invention relates generally to the field of surveying, and more specifically to a rod mounted level and tape assembly which will improve accuracy and facilitate the accomplishment of many routine surveying tasks.

The conventional height rod used in surveying consists of a straight post which is graduated in feet and decimals thereof. Considerable time and effort is involved in properly positioning such a rod in a vertical position so that sighted elevation may be accurately determined thereon. Similarly when taping distances between points above the ground it is important that the tape extend horizontally between the two points involved. This requirement is difficult to fulfill if the tape and rod must be separately held as is presently the case. I have provided a modified height rod wherein opposite sides of the rod are accurately notched to establish precise measurements thereon. Adjustably mounted to slide longitudinally of the rod are two connecting sleeves which may be operated in unison or individually as desired. The two sleeves provide the mounting means for a tape reel and hand level respectively.

It is therefore a primary object of this invention to provide means for increasing the efficiency and accuracy of taking measurement readings on a height rod in surveying work.

It is a further object of this invention to provide a surveying instrument which is simple to understand and operate, and enables a more precise use of the hand level when making measurements of elevation.

It is a still further object of this invention to provide a time saving instrument for the surveyor which is light and compact, and wherein the conventional hand level and tape may be simply removed for storage purposes or other requirements.

A full understanding of the construction of this invention, together with further novel features and advantages, will be had from the following detailed description of a preferred embodiment thereof, taken in conjunction with the attached drawings wherein:

FIG. 1 is a front elevation of the levelling instrument which comprises my invention, the rod being shown broken for drawing purposes.

FIG. 2 is a fragmentary cross sectional side elevation showing the locking levers for positioning the two components at the correct elevation on the rod.

FIG. 3 is a plan view of the instrument.

Similar reference characters indicate corresponding parts throughout the several views in the drawings.

Referring now to the drawings in detail, the numeral 5 represents an elongated height rod having opposed parallel side faces 6 and symmetrically disposed arcuate end faces 7. The lower end 8 of the height rod 5 is mounted in a rubber shoe 9 for the purpose of frictional engagement with smooth ground surfaces. One of the side faces 6 is graduated in feet indicated at 10 starting from the lower end 8, there being further intermediate graduations 11 representing a tenth of a foot. The adjacent end faces 7 are formed with consecutive notches 12 which accurately denote the precise elevation on the height rod.

A sleeve 13 has an opening 14 formed therethrough for slideably engaging over the rod, and protrudes beyond one of the end faces 7 to form a circular spring clip 15 for removably retaining a level indicated in broken lines at 16. Horizontally aligned with the centre of the level is a small window 17 formed in the sleeve 13 for the purpose of disclosing the precise elevation of the level. A spring loaded catch 18 is pivotally mounted between two protrusions 19 disposed beneath the spring clip 20 and is adapted to engage in a selected notch beneath the lower end 20 of the sleeve.

A second sleeve 21 of similar shape to the sleeve 13 is slideably mounted on the rod and may be selectively connected to the sleeve 13 by means of two clips 22 mounted on the side face of the sleeve. The second sleeve is provided with a similar catch 23 for positioning the sleeve in any desired position on the rod, the said catch being located vertically beneath the catch 18 such that they both may be operated in unison if so connected. A small pocket 24 protrudes from the sleeve on the side opposite to the catch and is adapted to receive a tongue 25 which is secured at its upper end to the centre of an automatic tape reel 26. The tape reel contains fifty feet of cloth or metallic tape indicated at 27 and a small window 28 is formed in the periphery of the tape casing such that the amount of tape extended may be read directly therein from the graduated side of the height rod. A trigger 29 protrudes from the bottom of the tape reel for rewinding the tape in an efficient manner.

This instrument is of value in most surveying operations and may be effectively utilized in the determination of rise and fall, measuring distance, cross section, setting grade stakes and slope stakes and preparing profile grades. The level of course may be used with or without tape, and the simple mounting of the tape simplifies holding the same taut and straight for increased accuracy.

Having described the invention with considerable particularity, it should be understood that various modifications may be made to the precise detail thereof, without departing from the scope or spirit of the invention, as defined in the claims.

I claim:

1. A levelling instrument comprising, in combination, a height rod, a sleeve adjustably mounted on the rod, a spring clip secured to the sleeve, a level removably retained by the clip, a second sleeve mounted on the rod selectively connected to one end of the first mentioned sleeve, means for individually locking said sleeves to the rod, and an automatic tape reel removably secured to the second sleeve.

2. A levelling instrument comprising, in combination, a height rod having opposed parallel side faces and arcuate end faces, spaced notches formed along and normally of said end faces, a sleeve slideably mounted on the height rod, catch means associated with the sleeve for engaging in said notches to lock the sleeve on the rod, a level clip secured to protrude from one side of the sleeve, a second sleeve slideably mounted on the rod and selectively attachable to one end of the first sleeve, catch means for locking the second sleeve on the rod, an automatic tape reel releasably mounted to one side of the second sleeve, and window means formed in the first sleeve for indicating the precise elevation of the centre of the level clip.

3. A levelling instrument comprising, in combination, a height rod having opposed parallel side faces, graduations marked on the side faces indicating the distance in feet from one end of the rod, end faces connecting said side faces, notches formed on the end faces positioned in line with said graduations, two sleeves having means for selectively locking the same in abutting alignment with each other, a window formed in one of the sleeves for viewing said graduations, catch means for independently locking said sleeves in said notches, a level removably secured to said one sleeve, a tape removably mounted on the remaining sleeve, and a rubber foot secured on said one end of the rod.

No references cited.